US008856345B2

(12) United States Patent
Lahtinen et al.

(10) Patent No.: US 8,856,345 B2
(45) Date of Patent: Oct. 7, 2014

(54) REDUNDANCY IN PROCESS CONTROL SYSTEM

(75) Inventors: Esa Lahtinen, Tampere (FI); Mika Karaila, Tampere (FI)

(73) Assignee: Metso Automation Oy, Helsinki (FI)

( * ) Notice: Subject to any disclaimer, the term of this patent is extended or adjusted under 35 U.S.C. 154(b) by 1812 days.

(21) Appl. No.: 10/922,104

(22) Filed: Aug. 20, 2004

(65) Prior Publication Data

US 2005/0097165 A1    May 5, 2005

Related U.S. Application Data

(63) Continuation of application No. PCT/FI03/00176, filed on Mar. 7, 2003.

(30) Foreign Application Priority Data

Mar. 11, 2002   (FI) ...................................... 20020453

(51) Int. Cl.
| G06F 15/16 | (2006.01) |
| G05B 9/03 | (2006.01) |
| G05B 19/418 | (2006.01) |
| H04L 29/06 | (2006.01) |
| H04L 29/08 | (2006.01) |

(52) U.S. Cl.
CPC .............. *G05B 9/03* (2013.01); *G05B 19/4185* (2013.01); *H04L 67/42* (2013.01); *H04L 29/06* (2013.01); *H04L 67/40* (2013.01); *G05B 2219/31208* (2013.01); *H04L 67/02* (2013.01); *G05B 19/4186* (2013.01); *G05B 2219/33125* (2013.01); *G05B 2219/31121* (2013.01); *G05B 2219/34263* (2013.01); *H04L 67/12* (2013.01); *H04L 69/329* (2013.01)
USPC ............ 709/227; 709/203; 709/201; 709/230

(58) Field of Classification Search
USPC ..................... 709/230, 203, 201, 227; 714/43
See application file for complete search history.

(56) References Cited

U.S. PATENT DOCUMENTS

| 5,502,817 | A | * | 3/1996 | Krone et al. ................... 709/243 |
| 6,377,573 | B1 | * | 4/2002 | Shaffer et al. ................. 370/356 |

(Continued)

FOREIGN PATENT DOCUMENTS

| EP | 0 927 942 A2 | 7/1999 |
| EP | 0927942 A2 | * | 7/1999 | .............. G06F 17/30 |

(Continued)

OTHER PUBLICATIONS

OPC Technical Overview.
OPC for Process Control.

*Primary Examiner* — Kyung H Shin
(74) *Attorney, Agent, or Firm* — Oliff PLC

(57) ABSTRACT

The invention relates to a method and an apparatus for arranging redundancy in a process control system comprising at least one client device, at least one data source and at least one server device providing data transfer between the client device and the data source. The method comprises arranging, for the client device, at least two parallel logical connections for transferring substantially the same data between at least one data source and the client device. At the client device, property information on data units transferred via different logical connections is checked, the client device being provided with predetermined order criteria for the property information. At the client device, property information on parallel data units transferred via different logical connections is compared. Data units delivered via the logical connection having, according to the predetermined order criteria, the best property information are selected for the use of one or more applications processing the data units.

19 Claims, 4 Drawing Sheets

(56) References Cited

U.S. PATENT DOCUMENTS

| | | |
|---|---|---|
| 6,522,934 B1 * | 2/2003 | Irwin et al. .................... 700/11 |
| 7,302,485 B2 * | 11/2007 | Bauer et al. ................... 709/227 |
| 2002/0087710 A1 * | 7/2002 | Aiken et al. .................. 709/232 |
| 2003/0110409 A1 * | 6/2003 | Gale et al. ........................ 714/4 |
| 2004/0024891 A1 * | 2/2004 | Agrusa et al. ................ 709/230 |

FOREIGN PATENT DOCUMENTS

| | | | |
|---|---|---|---|
| EP | 0927942 A2 * | 7/1999 | ............. G06F 17/30 |
| WO | WO 00/23857 | 4/2000 | |
| WO | WO 01/40882 A1 | 6/2001 | |

* cited by examiner understand # REDUNDANCY IN PROCESS CONTROL SYSTEM

This is a Continuation of Application No. PCT/FI03/00176 filed Mar. 7, 2003. The entire disclosure of the prior application is hereby incorporated by reference herein in its entirety.

BACKGROUND OF THE INVENTION

The invention relates to arranging redundancy in a process control system.

In an industrial process, a highly automated system is used for ensuring that the process operates in a correct manner. An industrial process, such as a paper making process or a power station process, is very extensive and complex, including many variables. An information system used for controlling an industrial process is responsible for various tasks relating to collecting, distributing, storing and presenting process properties as well as to process control. A process control system typically comprises a large number of work stations that operate independently or controlled by an operator. Such work stations carry out different process control related tasks, such as processing of measurement data and storage of historical data, according to the applications to be executed in the work stations.

Conventionally, process control systems have employed proprietary hardware and software solutions, in which case devices from different manufacturers are unable to communicate with each other. In such a case, it has been necessary to determine proprietary interfaces for applications in order to access data of different devices. In the process control industry, several standards have thus been developed to determine open communication interfaces to be used between the different devices of a process control system. An example of such an open standard is OPC (Object Linking and Embedding for Process Control). The OPC provides a set of interfaces, properties and methods based on ActiveX/COM (Component Object Model) technologies to be used for process control applications. A bus solution supporting the OPC standard comprises OPC clients and OPC servers. The OPC servers may communicate with proprietary devices and transfer data to different OPC clients that forward data to applications utilizing the data. The OPC enables a common interface to be provided for the applications so as to enable access to the data of different process control devices.

The functionality of OPC servers serving up to dozens of OPC clients thus plays a crucial role in the information system. In order to ensure the functionality of a system, redundancy of OPC servers may thus be arranged by doubling, meaning that in addition to a primary OPC server, the system is also provided with a secondary OPC server. Such a redundancy arrangement has been disclosed in WO 0 023 857, the solution according to the publication comprising switching over to using the secondary OPC server when the primary OPC server is no longer available. The secondary server may start carrying out the tasks of the primary server without the client devices noticing the change (the logical connection provided for the client device remains unchanged although the server device providing the connection changes). The solution disclosed in WO 0 023 857 does not, however, take any other error situations but server or connection failure into account, thus providing limited redundancy. Even if a server were working correctly, the connection e.g. between the server and a field or another device connected thereto may be completely lost or otherwise subjected to interference.

BRIEF DESCRIPTION OF THE INVENTION

An object of the invention is to provide an improved redundancy solution for process control systems. The objects of the invention are achieved by a method, a process control system, a process control system device and a computer program which are characterized by what has been disclosed in the independent claims. Preferred embodiments of the invention are disclosed in the dependent claims.

The idea underlying the invention is that a client device is provided with at least two parallel logical connections for transferring substantially the same data between at least one data source and the client device. Property information on parallel data units transferred via different logical connection is checked at the client device and compared. The client device is provided with predetermined order criteria according to which the parallel data units can be arranged in order of superiority. Parallel data units refer to data units whose payload to be used by an application is exactly or substantially the same. Data units delivered via the logical connection having, according to the predetermined order criteria, the best property information are selected for the use of one or more applications processing the data units. A logical connection refers to an arrangement formed by at least two data transfer entities for transferring data in a process control system; parallel logical connections are not necessarily arranged via physically separate data transfer devices. Data transfer via a logical connection may be either circuit- or packet-switched.

An advantage of the arrangement of the invention is that it is always possible to select the best ones from among parallel data units transferred via parallel connections. This enables redundancy to be arranged so as to also takes into account problems in data transfer that impair the quality of the data units transferred. Redundancy based on comparing the property information on parallel data units provides high-speed action as far as the application using the data units is concerned also when some of the connections fails, i.e. a delay caused by activating a new, substitutive connection (e.g. via a secondary server) is avoided.

According to a preferred embodiment of the invention, the property information to be compared consists of quality information associated by a server device supporting the OPC standard to OPC items, and the predetermined order criteria are based on arranging quality levels determined in different OPC specifications in order of superiority. This enables quality data fields determined already in the OPC specifications to be utilized in the redundancy of OPC connections.

According to yet another preferred embodiment of the invention, the property information to be compared consists of time stamps of the data units, and at the client device, the data units that have the most recent time stamps are selected from among the parallel data units of the logical connections. This enables the most recent possible information to be provided for the application. This embodiment may also complement the comparison of quality information preferably when, according to the quality information, parallel data units are equal.

BRIEF DESCRIPTION OF THE DRAWINGS

The invention is now described in closer detail in connection with the preferred embodiments and with reference to the accompanying drawings, in which.

DETAILED DESCRIPTION OF THE INVENTION

Figure 1:
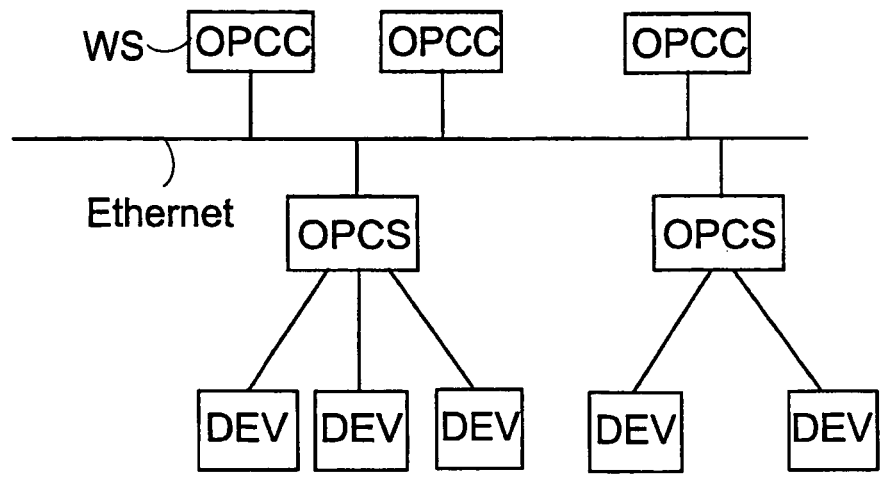
FIG. 1 is a block diagram generally showing a process control system.

Referring to the example in FIG. 1, a process control system comprises OPC clients OPCC, OPC servers OPCS, and devices DEV connected to the OPC servers. According to the applications to be executed therein, work stations WS comprising an OPC client OPCC may carry out various tasks: They may operate e.g. as engineering workstations, backup workstations, process control servers, diagnostics servers, operator servers or as alarm servers. Database workstations transferring data from a process and control information to the process are typically called process control servers.

An OPC server OPCS may be connected to a large variety of devices DEV, which usually require a proprietary interface. The devices DEV may be e.g. field devices, I/O units connected to field devices, databases, system bus devices, such as process control servers or OPC servers of other systems. An OPC server OPCS provides an interface for data sources, OPC items, and controls them. An OPC server OPCS is any server device providing one or more OPC interfaces, including at least an OPC data transfer interface (OPC DataAccess) for reading and writing data, an OPC alarm and event interface (OPC Alarm&Event) for indicating specified alarms and events to the OPC client OPCC, and an OPC historical data interface (OPC HistoricalData) for reading, processing and editing historical data. It is to be noted that in addition to the above-mentioned functions, also other OPC functionalities may be developed. OPC clients OPCC and OPC servers OPCS communicate e.g. over the Ethernet network.

Devices providing functions (OPCC, OPCS) according to a preferred embodiment comprise a memory, a user interface (typically at least a display, a keyboard and a mouse), means for transferring data (typically a network interface card and software controlling data transfer) and a central processing unit CPU comprising one or more processors. An information system may, however, also comprise devices to be controlled via a network, comprising no user interface. The memory comprises a non-volatile part for storing program code controlling the CPU and other data to be stored, and a volatile part for storing data temporarily.

Figure 2:
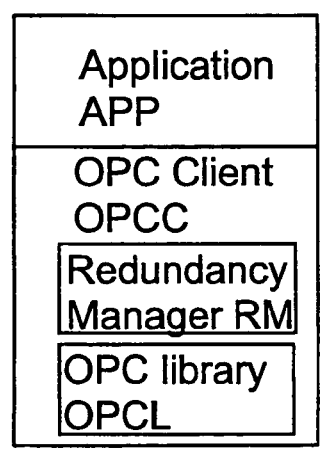
FIG. 2 is a block diagram showing the operational structure of a server of a process control system according to a preferred embodiment of the invention.

FIG. 2 illustrates the operational structure of a device (WS) comprising an OPC client functionality of a process control system according to a preferred embodiment. The device comprises one or more applications APP and an OPC client functionality OPCC. The OPC client functionality OPCC comprises an OPC redundancy functionality (Redundancy Manager RM) and an OPC library OPCL. The application APP may be e.g. a display application, a trend application or a report application. The OPC client functionality OPCC is responsible for communicating with the OPC server OPCS, using the OPC libraries OPCL. The OPC client functionality OPCC may, utilizing data transfer protocols of lower layers (typically TCP/IP/Ethernet), arrange several parallel logical OPC connections with one or more OPC servers OPCS. The redundancy manager RM according to a preferred embodiment is responsible for estimating parallel logical connections in a manner illustrated in closer detail in FIG. 3. The blocks illustrated in FIG. 2 may be implemented by computer program code to be executed in one or more central processing units CPU of the workstation WS, the computer program code being able to use a conventional operating system.

Figure 3:
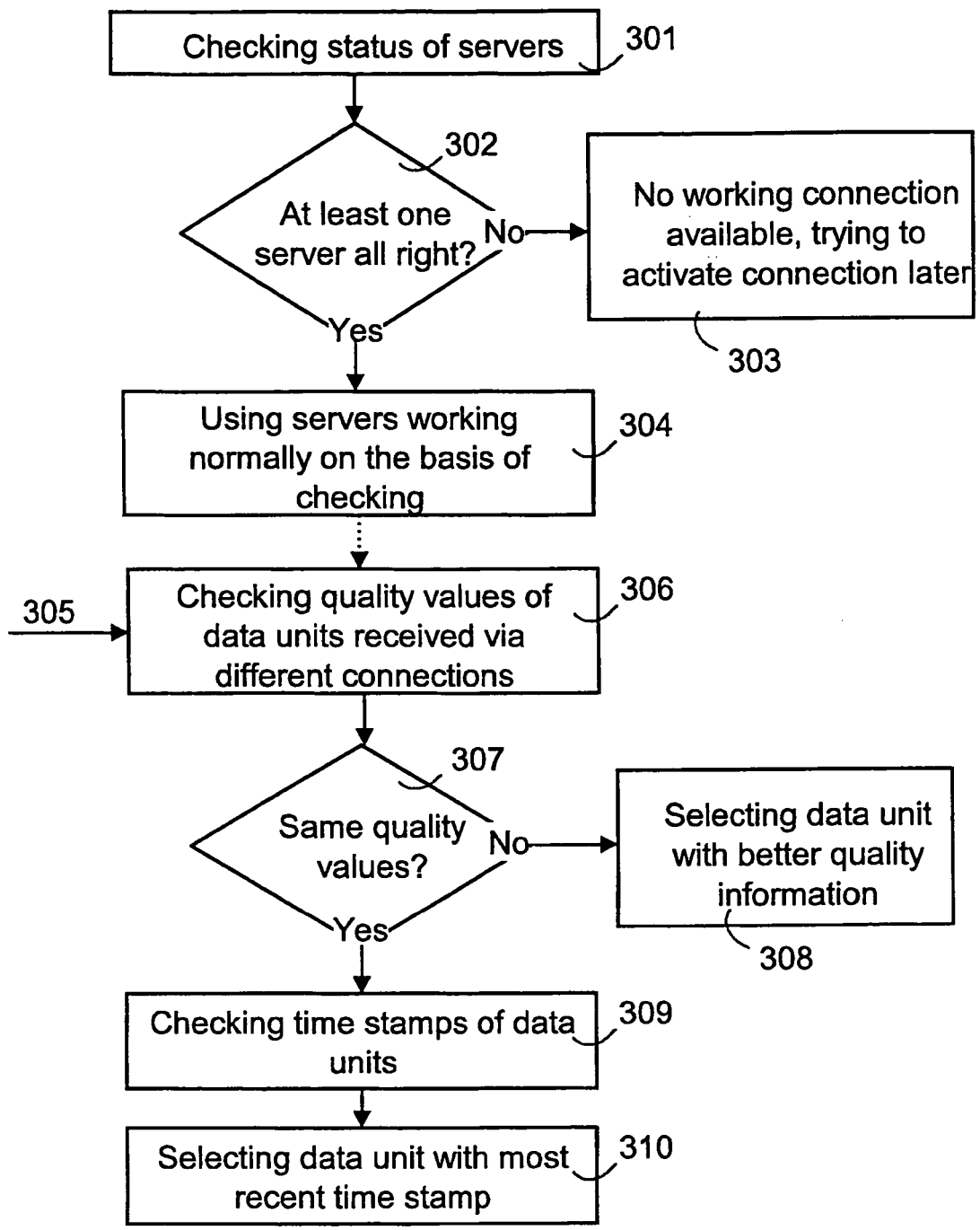
FIG. 3 is a block diagram showing a method of a preferred embodiment of the invention.

FIG. 3 illustrates a redundancy method according to a preferred embodiment, implemented by an OPC client functionality OPCC and preferably the redundancy manager RM illustrated in FIG. 2. Preferably, the status of the servers OPCS is checked 301 when the interface of the OPC servers OPCS is to be used, e.g. when information indicated by OPC data items is to be retrieved using an OPC data transfer interface. Step 301 can also be carried out at other times, e.g. in connection with setting up logical connections, or at predetermined intervals. The status of the servers OPCS may be checked 301 separately by requesting (GetStatus) status information on the OPC servers OPCS (OPC SERVER STATUS) or by checking the status information provided by the servers OPCS automatically. If the status information (OPC-SERVERSTATE) indicates that the OPC server operates normally, i.e. the value is OPC_STATUS_RUNNING, the server is in proper condition. Preferably, in connection with all other status information values, the server is interpreted to be out of order.

If, on the basis of the checking 301, 302, not a single working server OPCS is available, no OPC interface is available 303 for the OPC client OPCC. In such a case, it is possible to retry to activate 303 a logical connection later. Otherwise, the OPC client OPCC selects for its use 304 one or more servers OPCS that, on the basis of the checking, operate normally.

In order to ensure redundancy for data transfer to be provided for one or more applications APP, at least two parallel logical connections are arranged to transfer substantially the same data units from the same device DEV. Typically, but not necessarily, these parallel connections are arranged via different servers OPCS. Different configurations enabling the redundancy to be arranged will be illustrated in closer detail below in connection with FIGS. 4 to 7. When the client OPCC receives 305 data units transferred via different connections, e.g. data of OPC items of an OPC data transfer interface, the quality information on the received data units carrying the same payload is checked 306.

If, on the basis of the checking and comparison 306, 307, the quality values are different, a data unit whose quality information indicates that it is of higher quality than other data units parallel therewith is selected 308 to be provided for the application APP. The process may thus move to step 308 if a data unit is found which has a better quality value than that of any other parallel data unit. If at least two data units exist that have the same quality values that are better than those of possible other data units, the process moves to step 309. If in step 305 no parallel data units are received at all via a logical connection, the particular logical connection is interpreted to be defective, in which case data units of parallel logical connections are selected to be used 308.

According to a preferred embodiment, the quality information to be compared consists of quality information determined by the server OPCS for quality bit fields of OPC items. Quality information can be determined for the OPC items on the basis of quality statuses available at the OPC data transfer interface. Quality bits indicating quality information are arranged in the following manner:

QQSSSSLL.

QQ bits determine three possible quality statuses (bad, good, uncertain). SSSS bits are substatus bits whose different values enable each quality status to be further defined. LL bits are limit bits that may provide diagnostic information. Data units can be arranged in order of superiority by utilizing any order criteria predetermined for the OPC client OPCC. All (comparing the QQSSSSLL bit combinations of parallel OPC items) or only some of the quality bits determined in the OPC specifications for the OPC items can be used in the comparison. It is also possible to determine new fields for determining the status of data units and to use them for comparing parallel data units. According to a preferred embodiment, QQ bits are used in the comparison, in which case the predetermined order criteria from the best to the worst are 'Good'→'Uncertain'→'Bad'. Consequently, the data units which, according to the QQ bits, have 'Good' as the quality status, have better properties than the rest of the data units. If the quality statuses of two parallel data units are 'Uncertain' and 'Bad', the best one, i.e. the data unit having the status 'Uncertain', is selected to be used. According to a preferred embodiment, the comparison uses bits QQSSSS, i.e. the values of the QQSSSS bits of different OPC items are compared. In such a case, the comparison of the substatus bits SSSS further defines the quality statuses of the QQ bits, the comparison preferably being carried out if parallel data units have the same QQ bit status. It is also possible that the client OPCC selects for use the data units of those logical connections only whose quality information indicates good quality, i.e. whose value is 'Good'.

In step 309, the time stamps of the data units to be compared are checked. Preferably, only the data units that have the best quality values are selected for step 309, preferably only the data units that have the OPC quality status 'Good'. If the best quality status is 'Bad', it can also be used. Particularly if a data unit has a 'Last Known Value' (the bit value being 000101LL) as its substatus, it may still be usable since in spite of unsuccessful communication, the last known value is still available. Typically, the OPC server OPCS has added a time stamp to the OPC data unit. The time stamp may indicate e.g. the point of time at which a measurement value contained in the payload was measured. In a data structure OPCITEM-STATE describing the status of an OPC item, a time stamp may be provided either by a device (DEV) or a server OPCS. If the device DEV supports time stamps, it may determine the time stamp of the OPC data unit, it may e.g. timestamp the measurement value.

On the basis of the checking 309, a data unit having the most recent time stamp is selected. This data unit is transferred to be used by one or more applications APP processing the data units. The application APP is thus always provided with one data unit which is as high-quality and new as possible. The way in which the application APP processes the received data unit depends on the application and is irrelevant to the invention.

Thus, the redundancy of transfer of a necessary data unit from the device DEV, e.g. a setting or measurement value, can thus be implemented by utilizing the quality and/or time information on the data units. It is also possible to transfer data from the client OPCC to the server OPCS via parallel logical connections. If the logical connections are arranged via different servers, each server is provided with the same data. In such a case, however, preferably only one server OPCS writes further to the device DEV.

According to a preferred embodiment, steps 306 to 310 illustrated in FIG. 3 are performed on each group of data units formed by parallel data units containing substantially the same payload. After step 310, the process may thus start waiting for the next data unit to be received and compare it with parallel data units transferred via other logical connections. It is also possible to perform steps 306 to 310 only on some of the received data unit groups: For example, checking is performed on every fifth received data unit group, wherein a data unit is selected, according to step 308 or 310. Next, the next four data units received via the same logical connection as the data unit selected on the basis of the checking can be automatically selected to be delivered to the application.

The order of superiority of the data units (on the basis of quality information or some other property information on the data units) can be determined in accordance with the configuration, which enables order criteria for different purposes and situations to be customized in a versatile manner. The order criteria to be used and the application thereof can be selected e.g. on the basis of the data to be transferred. Different applications APP could also be provided with different order criteria according to which the superiority of parallel data units is to be determined.

The functionality illustrated in FIGS. 2 and 3 enables the redundancy of data transfer to be centralized in the redundancy manager RM of the OPC client OPCC, and no redundancy functionality needs to be arranged in the OPC servers OPCS or applications APP (if desired, additional redundancies can naturally also be provided between applications and servers). Consequently, a preferred embodiment of the invention does not require any additional functionality in the OPC servers OPCS or in the devices DEV connected to the OPC servers.

It is to be noted that the client OPCC (redundancy manager RM) may implement only some of the steps illustrated in FIG. 3. For example, the server checking and selection in steps 301 to 304 is by no means necessary, and no time stamps necessarily need to be used for selecting data units (neither do all time units necessarily have usable time stamps).

Figure 4:
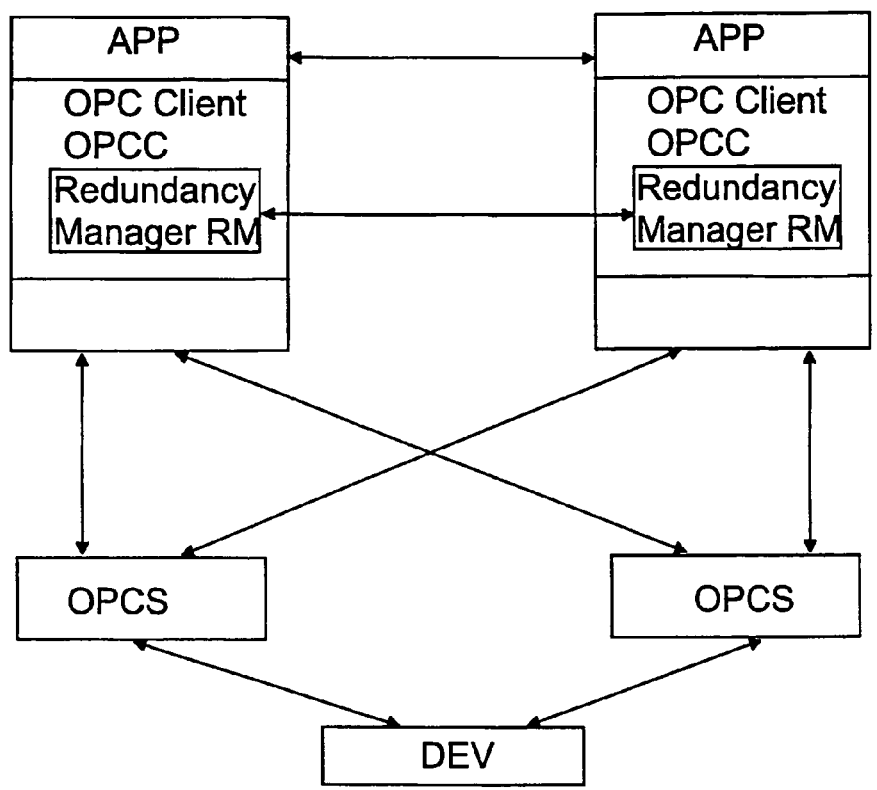
FIG. 4 is a block diagram showing a redundancy configuration according to a first embodiment.

FIG. 4 illustrates a redundancy configuration according to a first embodiment, wherein redundancy is arranged for an OPC server OPCS (including connections to one or more devices DEV), an OPC client functionality OPCC and an application APP. The servers OPCS provide both OPC clients OPCC with the same data units. Preferably in the manner illustrated in FIG. 3, the OPC clients OPCC select a server and the best ones from among the parallel data units on the basis of the property information on the parallel data units and the predetermined order criteria (on the basis of quality and/or time stamp information) and transmit them to the applications APP. In the embodiment of FIG. 4, preferably one of the applications APP is active, in which case the passive application and the data units provided thereto by the OPCC are used when problems are detected in the operation of the active application. Preferably, the application used in the OPCC is such an application which uses a connection the data units transferred via which connection are the data units that, on the basis of the property information on the data units, are the best ones. The embodiment of FIG. 4 enables redundancy to be arranged for the connection between the server OPCS and the device DEV, the connection between the server OPCS and the client OPCC, redundancy managers RM and applications APP.

Figure 5:
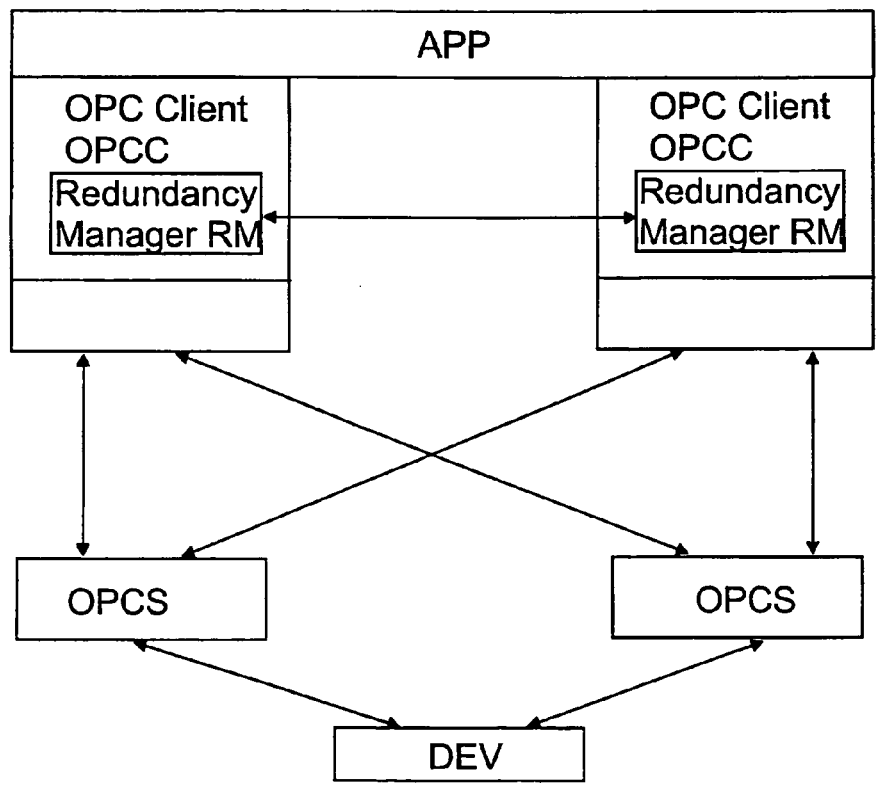
FIG. 5 is a block diagram showing a redundancy configuration according to a second embodiment.

FIG. 5 illustrates a redundancy configuration according to a second embodiment, wherein an application APP utilizes two OPC client functionalities OPCC. Redundancy is thus arranged for the OPC server OPCS and the OPC client functionality OPCC. The redundancy manager RM may operate as illustrated in FIG. 3, i.e. it may always select data units delivered to the OPCC via a better logical connection for the application APP. The application APP selects, according to its own criteria, a data unit delivered by another OPCC for its use. The APP may select the data unit on the basis of the properties of its payload, e.g. on the basis of the time stamp determined in the payload. In the embodiments disclosed in FIGS. 4 and 5, it must be ensured that only one of the clients OPCC transmits data (write connection) back to the servers OPCS and further to one or more devices DEV.

Figure 6:
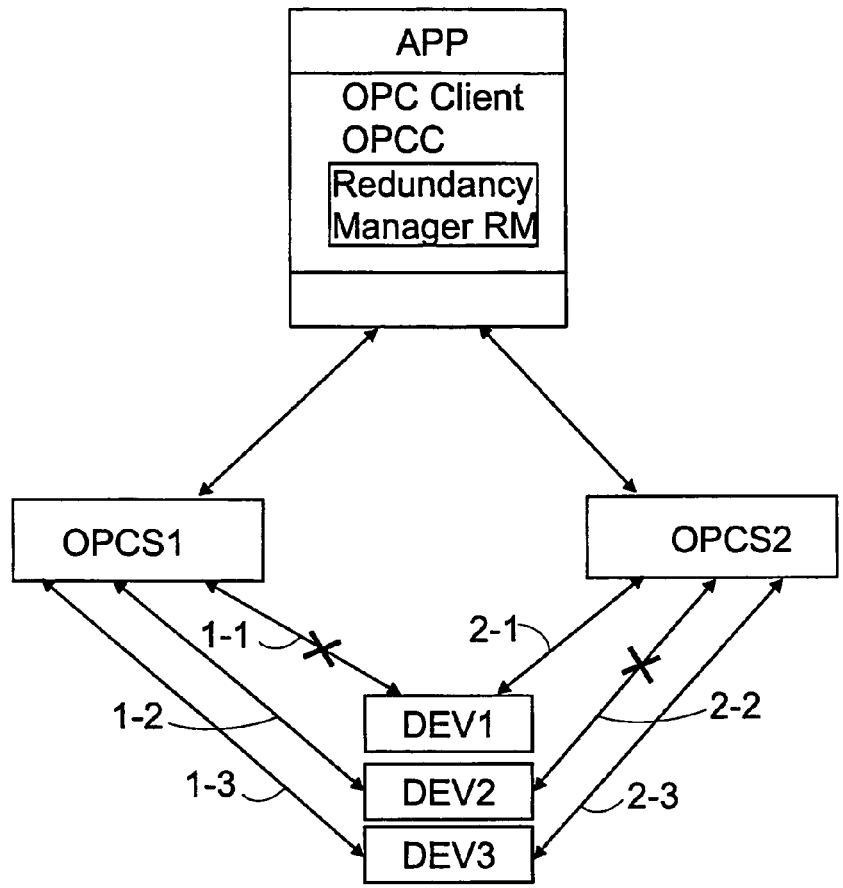
FIG. 6 is a block diagram showing a redundancy configuration according to a third embodiment.

FIG. 6 illustrates a redundancy configuration according to a third embodiment, wherein redundancy is arranged for OPC servers OPCS1, OPCS2, thus providing an OPC client OPCC with parallel logical connections. The RM may select a data unit, preferably in the manner illustrated in steps 305 to 310 in FIG. 3. FIG. 6 illustrates a situation wherein the client device OPCC has a need to receive data units from three devices DEV1, DEV2 and DEV3. Three connection pairs are then formed: 1-1, 2-1; 1-2, 2-2 and 1-3, 2-3. In the example of FIG. 6, it is detected, preferably on the basis of the checking illustrated in FIG. 3, that the data units transferred to the device DEV1 via the connection 1-1 used by the OPC server OPCS1 are of poor quality, or that they are missing altogether, in which case the connection 2-1 of the server OPCS2 and the data units transferred therethrough are used in the application APP of the OPC client device OPCC. However, the connection 2-2 provided by the server OPCS2 for the device DEV2 is defective, so the OPCC selects the data units transferred from the device DEV2 via the connection 1-2 and the server OPCS1 to be used by the application APP. From the device DEV3, the connections 1-3 and 2-3 are in proper condition, and it is assumed that the data units transferred via the particular connections also otherwise remain equal in quality, which always enables the OPCC to select the most recent data unit for the application APP. Thus, according to a preferred embodiment, the OPCC may use several different servers for transferring data units transferred from different devices, whereby it is always possible to arrange data transfer via a parallel logical connection when a logical connection (or a server) fails.

Figure 7:
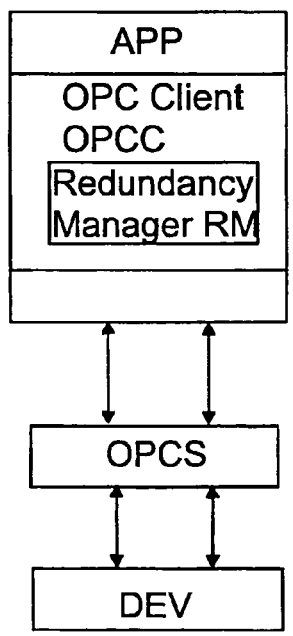
FIG. 7 is a block diagram showing a redundancy configuration according to a fourth embodiment.

FIG. 7 illustrates a redundancy configuration according to a fourth embodiment, wherein two parallel logical connections are provided via a server OPCS for transferring data of a device DEV (one or more). This enables redundancy to be arranged particularly for the connection between the server OPCS and the device DEV as well as for the connection between the server OPCS and a client OPCC.

It is to be noted that in addition to the configurations shown in FIGS. 4 to 7, several other configurations may also exist wherein the present redundancy method can be utilized. In the embodiment of FIG. 7, for example, wherein the parallel logical connections are arranged via one server OPCS, two applications APP instead of one application APP may be provided, as illustrated in FIG. 4.

The redundancy method illustrated above may be utilized at any OPC interface the data units according to which comprise quality and/or time information. A server OPCS providing an OPC data transfer interface (OPC DataAccess) comprises several objects: server, group and item. An OPC server object maintains information on the server and stores OPC group objects. Through adding, removing and modifying the OPC group objects, a client OPCC is able to organize information according to the needs of applications APP. An OPC group object maintains information on itself and provides means for adding, removing and organizing OPC items. A group may e.g. present a certain report which an operator monitoring a process desires to get about a part of the process. A group thus determines several OPC items that in a group identify the data source from which the data is obtained. The information indicated by the OPC item may be e.g. a process value or a set value. The OPC client OPCC may determine e.g. a certain time interval during which information is retrieved from the data sources indicated by the OPC items determined by the group. If necessary, the OPCS retrieves information typically via proprietary interfaces from one or more devices DEV (a software interface and/or a hardware interface) and organizes the information into a format determined by an OPC data transfer interface specification. The information indicated by the OPC item can then be transmitted to the client OPCC. This can be called OPC item transfer to OPC client OPCC, the OPC data unit to be transferred providing the client with a value (data contained in the address), quality, time stamp and a data type. It is also possible for the OPC client OPCC to write to the address indicated by the OPC item. Data units provided by the OPC alarm and event interface (OPC Alarm&Event) or the OPC historical data interface (OPC HistoricalData) may also comprise quality information and/or time stamps that can be utilized in redundancy as described above.

It is obvious to one skilled in the art that as technology advances, the basic idea of the invention can be implemented in many different ways. The invention and its embodiments are thus not restricted to the abovedescribed examples but may vary within the scope of the claims. In addition to the OPC standard interfaces described above, the invention can also be applied in connection with other interfaces, e.g. in a protocol called DAIS (Data Acquisition from Industrial Systems) of an OMG (Object Management Group) protocol.

The invention claimed is:

1. A method for arranging redundancy in a process control system comprising at least one client device, at least one data source and at least one server device providing data transfer between the at least one client device and the at least one data source, the method comprising:

arranging, for one client device of the at least one client device, at least two parallel logical connections for transferring the same data in parallel between one data source of the at least one data source and the one client device, checking, at the one client device, property information on parallel data units transferred by the parallel logical connections, the one client device being provided with predetermined order criteria for the property information, comparing, at the one client device, property information on the parallel data units transferred by the parallel logical connections, and selecting data units, based on the comparing step, delivered via the parallel logical connections, having, according to the predetermined order criteria, the best property information for the use of one or more applications processing the data units, wherein the parallel logical connections between the one client device and one server device of the at least one server device are arranged according to an OPC standard {OLE (Object Linking and Embedding) for Process Control}, and for each comparing step, the selecting step selects a single data unit, having the best property information, from among the parallel data units, and disregards other data units from among the parallel data units.

2. A method as claimed in claim 1, wherein the property information to be compared includes quality information determined by the one server device for quality bit fields of OPC items, and the OPC items of the parallel logical connections whose quality information indicates the best quality are used at the one client device.

3. A method as claimed in claim 2, wherein the OPC items are selected on the basis of quality statuses in the following order of superiority, from the best quality to the worst quality: 'Good' ® 'Uncertain' ® 'Bad'.

4. A method as claimed in claim 1, wherein the property information to be compared includes time stamps of the parallel data units, and the parallel data units of the parallel logical connections whose time stamps are the most recent ones are selected at the one client device.

5. A method as claimed in claim 4, wherein the quality information on the parallel data units is first compared, and the time stamps are compared in response to the quality information indicating that different data units are equal in quality.

6. A method as claimed in claim 1, wherein at least two parallel applications are arranged in the one client device to implement the parallel logical connections, and such an application which uses a connection the parallel data units transferred via which connection are, on the basis of the property information on the parallel data units, the best ones, is used at the one client device.

7. A method as claimed in claim 1, wherein at least two parallel client interfaces are arranged in the one client device to implement the parallel logical connections, and the data carried by the client interface the parallel data units transferred via which are, on the basis of their property information, the best ones, is selected.

8. A method as claimed in claim 1, wherein the parallel logical connections are arranged via different server devices, thereby the server statuses of the different server devices are checked before comparing the property information on the parallel data units, and the property information is compared only on the parallel data units transferred via the server units whose status indicates that the server units operate normally.

9. The method as claimed in claim 1, wherein the one client device is a single device.

10. A process control system comprising at least one client device, at least one data source and at least one server device providing data transfer between the at least one client device and the at least one data source, wherein at least two parallel logical connections can be arranged for one client device of the at least one client device for transferring the same data in parallel from one data source of the at least one data source, the one client device is configured to check property information on parallel data units transferred by the parallel logical connections, the one client device being provided with predetermined order criteria for the property information, the one client device is configured to compare property information on the parallel data units transferred by the parallel logical connections to obtain comparison results, the one client device is configured to select data units, based on the comparison results, delivered via the parallel logical connections, having, according to the predetermined order criteria, the best property information for the use of one or more applications processing the data units, the parallel logical connections between the one client device and one server device of the at least one server device are arranged according to an OPC standard {OLE (Object Linking and Embedding) for Process Control}, and for each comparing, the one client device selects a single data unit, having the best property information, from among the parallel data units, and disregards other data units from among the parallel data units.

11. The process control system as claimed in claim 10, wherein the one client device is a single device.

12. A device of a process control system, comprising a client device functionality for communicating with at least one server device providing data transfer in the process control system between the device and at least one data source, wherein the device is configured to set up at least two parallel logical connections for transferring the same data in parallel from one data source of the at least one data source, the device is configured to check property information on parallel data units received by the parallel logical connections, the device being provided with predetermined order criteria for the property information, the device is configured to compare property information on the parallel data units transferred by the parallel logical connections to obtain comparison results, the device is configured to select data units, based on the comparison results, delivered via the parallel logical connections, having, according to the predetermined order criteria, the best property information for the use of one or more applications processing the data units, and the parallel logical connections between the device and one server device of the at least one server device are arranged according to an OPC standard {OLE (Object Linking and Embedding) for Process Control}, and for each comparing, the device selects a single data unit, having the best property information, from among the parallel data units, and disregards other data units from among the parallel data units.

13. A device as claimed in claim 12, wherein the property information compared by the device includes quality information determined by the one server device for quality bit fields of OPC items.

14. A device as claimed in claim 12, wherein the property information compared by the device includes time stamps of the parallel data units.

15. The device as claimed in claim 12, wherein the device is a single client device.

16. A non-transitory computer readable medium storing a computer program for controlling at least one device of a process control system, wherein the computer program controls the at least one device to:

arrange at least two parallel logical connections for transferring the same data in parallel between one data source of at least one data source and one device of the at least one device via one server device of at least one server device, check property information on parallel data units transferred by the parallel logical connections, compare property information on the parallel data units transferred by the parallel logical connections to obtain comparison results, select the data units, based on the comparison results, having, according to predetermined order criteria, the best property information for the use of one or more applications processing the parallel data units, wherein the parallel logical connections between the one device and the one server device are arranged according to an OPC standard {(OLE (Object Linking and Embedding) for Process Control}, and for each compare step, the select step selects a single data unit, having the best property information, from among the parallel data units, and disregards other data units from among the parallel data units.

17. The non-transitory computer readable medium as claimed in claim 16, wherein the property information to be compared includes quality information determined by the one server device for quality bit fields of OPC items, and the OPC items of the parallel logical connections whose quality information indicates the best quality are used at the one client device.

18. The non-transitory computer readable medium as claimed in claim 17, wherein the OPC items are selected on the basis of quality statuses in the following order of superiority, from the best quality to the worst quality: 'Good' ® 'Uncertain' ® 'Bad'.

19. The non-transitory computer readable medium as claimed in claim 16, wherein the one device is a single client device.

* * * * *